United States Patent [19]

Brock

[11] Patent Number: 5,398,565
[45] Date of Patent: Mar. 21, 1995

[54] SHIFT LEVER ASSEMBLY

[75] Inventor: Robert D. Brock, Grand Haven, Mich.

[73] Assignee: Grand Haven Stamped Products Company, a Division of JSJ Corporation, Grand Haven, Mich.

[21] Appl. No.: 13,618

[22] Filed: Feb. 4, 1993

[51] Int. Cl.⁶ .................... F16H 63/38; F16H 59/02
[52] U.S. Cl. ................................... 74/475; 74/473 R
[58] Field of Search .......................... 74/473 R, 475

[56] References Cited

U.S. PATENT DOCUMENTS

| | | | |
|---|---|---|---|
| 3,643,528 | 2/1972 | van der Loos | 74/475 X |
| 3,902,378 | 9/1975 | Osborn | 74/475 |
| 4,936,158 | 6/1990 | Livshits et al. | 74/475 |
| 4,977,789 | 12/1990 | Osborn | 74/475 |
| 5,076,112 | 12/1991 | Williams | 74/475 X |
| 5,156,061 | 10/1992 | Ishizuki et al. | 74/475 |
| 5,187,998 | 2/1993 | Asano et al. | 74/475 X |
| 5,277,077 | 1/1994 | Osborn | 74/475 |

Primary Examiner—Allan D. Herrmann
Attorney, Agent, or Firm—Price, Heneveld, Cooper, DeWitt & Litton

[57] ABSTRACT

A shift lever assembly for a vehicle is provided. The shift lever assembly includes a vertically oriented detent plate having a Z-shaped slot defining a 2-wheel-drive (2H) position, a 4-wheel-drive (4H) position, a neutral (N) position, and a 4-wheel-drive low-speed (4L) position. An actuator pivotally mounts to the detent plate and transfer case, the actuator including a first arm including a connector adapted to connect to a shift mechanism on a vehicle transfer case, and a second arm. A lever subassembly pivotally mounts to the actuator second arm and includes a detent pin adapted for movement in the Z-shaped slot. The lever subassembly is biased so that the detent pin engages the Z-shaped slot. As the lever subassembly is moved along a first path, it drives the connector on the actuator along a corresponding second path to shift the shifting mechanism. The Z-shaped slot and detent pin cooperate along with the actuator and lever subassembly to allow the operator to shift the lever from the 2H position through the 4H and N positions to the 4L position with a continuous "pull-down" type motion by the operator, which motion is ergonomical and readily performable by the operator, but which motion prevents accidentally "crashing-through" the positions from 2H through 4H and N positions to the 4L position.

30 Claims, 7 Drawing Sheets

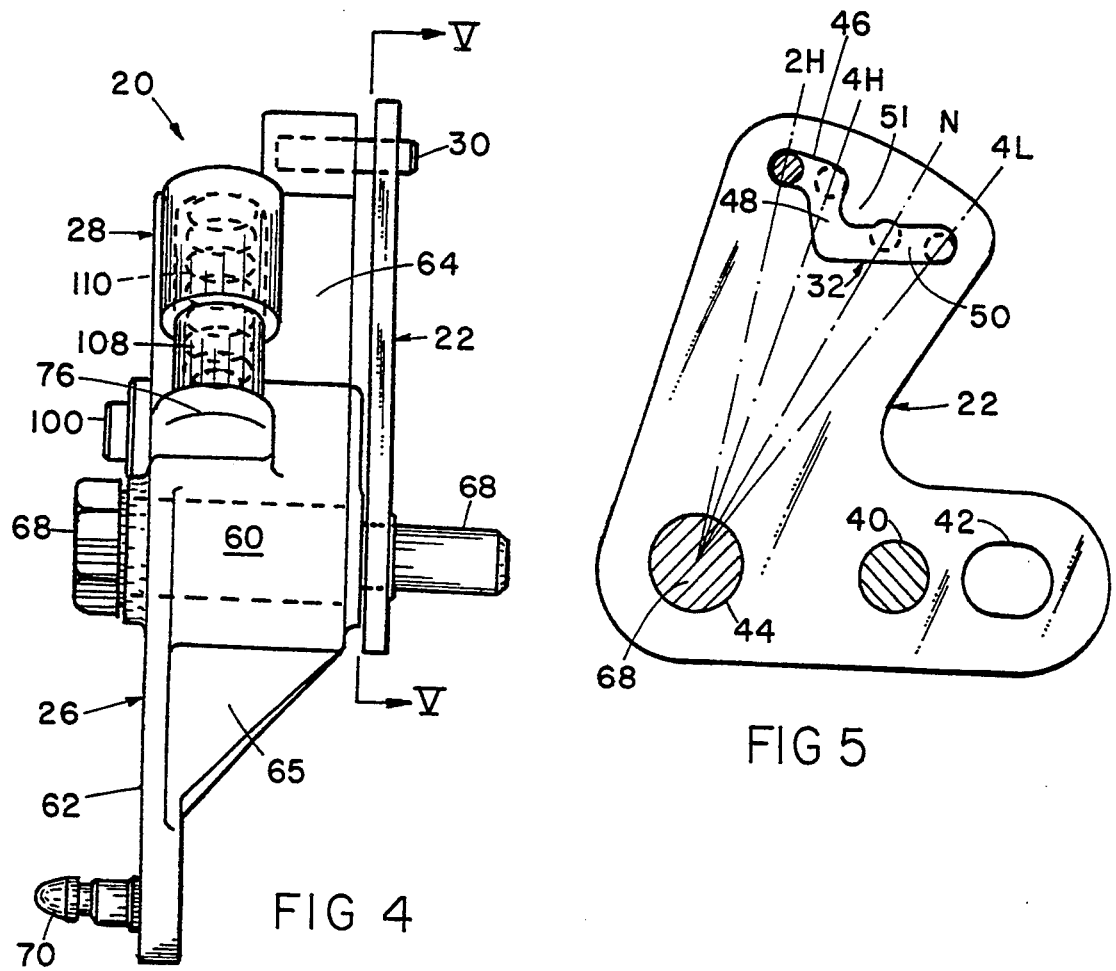
FIG 4
FIG 5
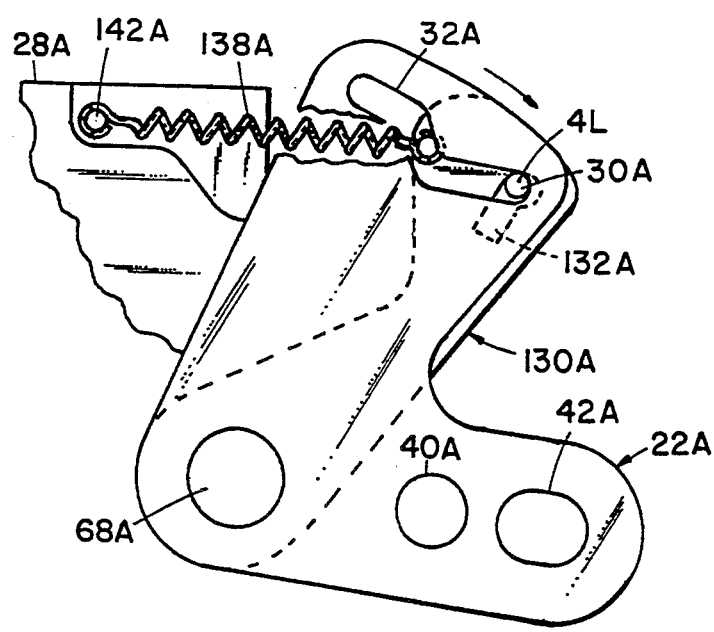
FIG 14

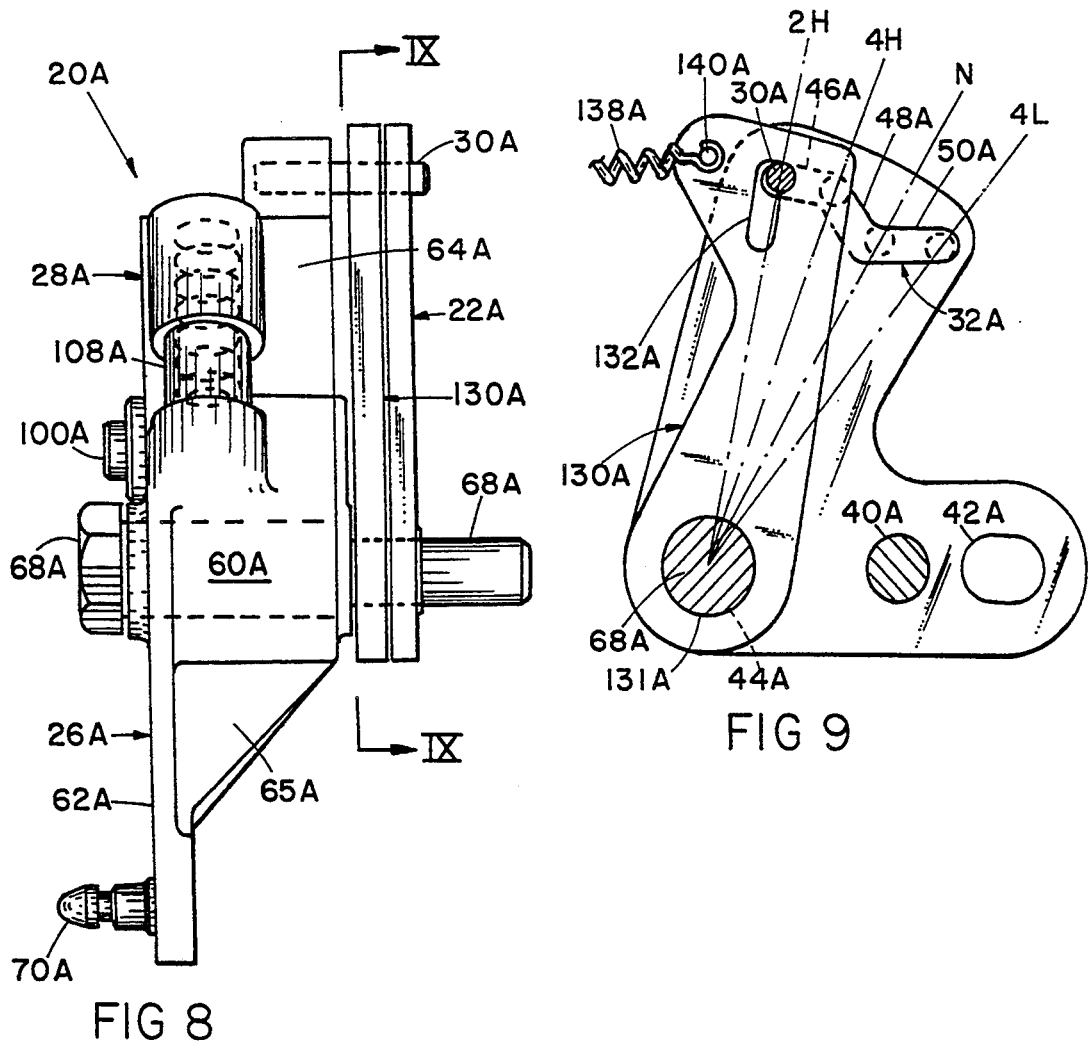
FIG 8
FIG 9
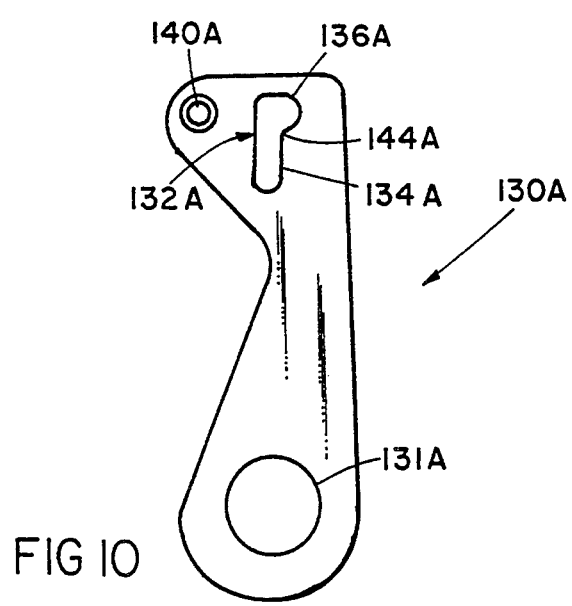
FIG 10

SHIFT LEVER ASSEMBLY

BACKGROUND OF THE INVENTION

The present invention relates generally to shift lever assemblies for vehicles and, more particularly, is directed to an automotive shifter for a transfer case, the shifter being adapted for improved assembly and shifting movement.

Many modern vehicles are adapted with 4-wheel-drive capability. However, to conserve fuel and minimize part wear, these vehicles are often adapted with transmissions that cooperate with transfer cases and shifting mechanisms to allow an operator to selectively shift between 2-wheel-drive (2H) and 4-wheel-drive (4H) operating conditions. Further, many if not most of these vehicles are also adapted to shift to a 4-wheel-drive low-vehicle-speed (4L) operating condition. The shift lever assemblies commonly used in these applications attach to the transfer case and include a shift lever that extends through the floor of the vehicle into the vehicle compartment. In order to prevent accidental shifting from 2H or 4H conditions into the 4L condition, the known shift lever assemblies require that the shift lever assembly be moved rearwardly, then pressed downwardly, and then moved rearwardly again. However, this movement is cumbersome and awkward for an operator to perform. Further, the known shift lever assemblies include a plurality of parts which are less efficient and more costly to assemble than is desired.

Thus, an improved shift lever assembly solving the aforementioned problems is desired.

SUMMARY OF THE INVENTION

In one aspect, the invention includes a shift lever assembly for a vehicle, the vehicle including a transfer case with shifting means therein for shifting between a plurality of gear positions. The shift lever assembly includes a detent plate with slot means defining various positions corresponding to the gear positions and with means for attaching to the transfer case. An actuator is pivotally connected to the detent plate, the actuator including a connector adapted to connect to the shifting means in the transfer case. A lever subassembly is pivotally connected to the actuator and includes a detent pin adapted to move in the slot means in the detent plate. A biasing means biases the lever subassembly rotationally with respect to the actuator so that the detent pin operably engages the slot means so that the lever subassembly moves through a desired path as the lever subassembly is moved to actuate the actuator.

In another aspect, the invention includes a shift lever assembly including a detent plate adapted for mounting to a transfer case, an actuator including connector means for connecting to a shifting means in the transfer case, and a lever with a handle adapted to be grasp by an operator. Means are provided for interconnecting the actuator to the detent plate, for interconnecting the lever to the actuator, and for operably connecting the lever to the detent plate. Further, means are provided for controlling the movement of the lever so that the handle moves through a first path during which the connector means is driven through a second path as required to shift the shifting means, the first path being oriented generally rearwardly and downwardly relative to the operator thus permitting the operator to shift between the gear positions with a continuous and ergonomic "pull-down" shift motion of the handle. Thus, an ergonomic shift motion of the handle is provided, but with controlled movement as required to prevent accidental "crash-through" as the shifting means is shifted between the plurality of gear positions.

The preferred embodiment offers several advantages over known art. The preferred shifter can be shifted with a continuous ergonomic "pull-down" motion, and does not require an operator to awkwardly press downwardly on the shifter, which is a characteristic of known shifters in like applications. Further, the lever movement and force required to move the lever is controlled in a manner which allows simplification of parts, reduction in the number of parts, simplification of assembly, substitution of parts for different lever movements, and allows for sure and reliable operation.

A method for assembling the aforementioned shift lever assembly is also provided.

The function and advantages of the present invention will become apparent after considering the following detailed specification which discloses a preferred embodiment thereto in conjunction with the accompanying drawings wherein.

BRIEF DESCRIPTION OF THE DRAWINGS

FIG. 4 is a rear end view of the shift lever assembly shown in FIG. 2;

FIG. 5 is a cross-sectional view taken along the plane V—V in FIG. 4;

FIG. 8 is an end view of a modified shift lever assembly including a detent plate;

FIG. 9 is a cross-sectional view taken along the plane IX—IX in FIG. 8;

FIG. 10 is a side view of the detent plate shown in FIG. 8;

FIGS. 12-14 are side elevational views showing the movement of the detent pin and detent plate as the shift lever is moved through the 4H, N and 4L positions, respectfully.

DETAILED DESCRIPTION OF THE PREFERRED EMBODIMENT

Figure 1:
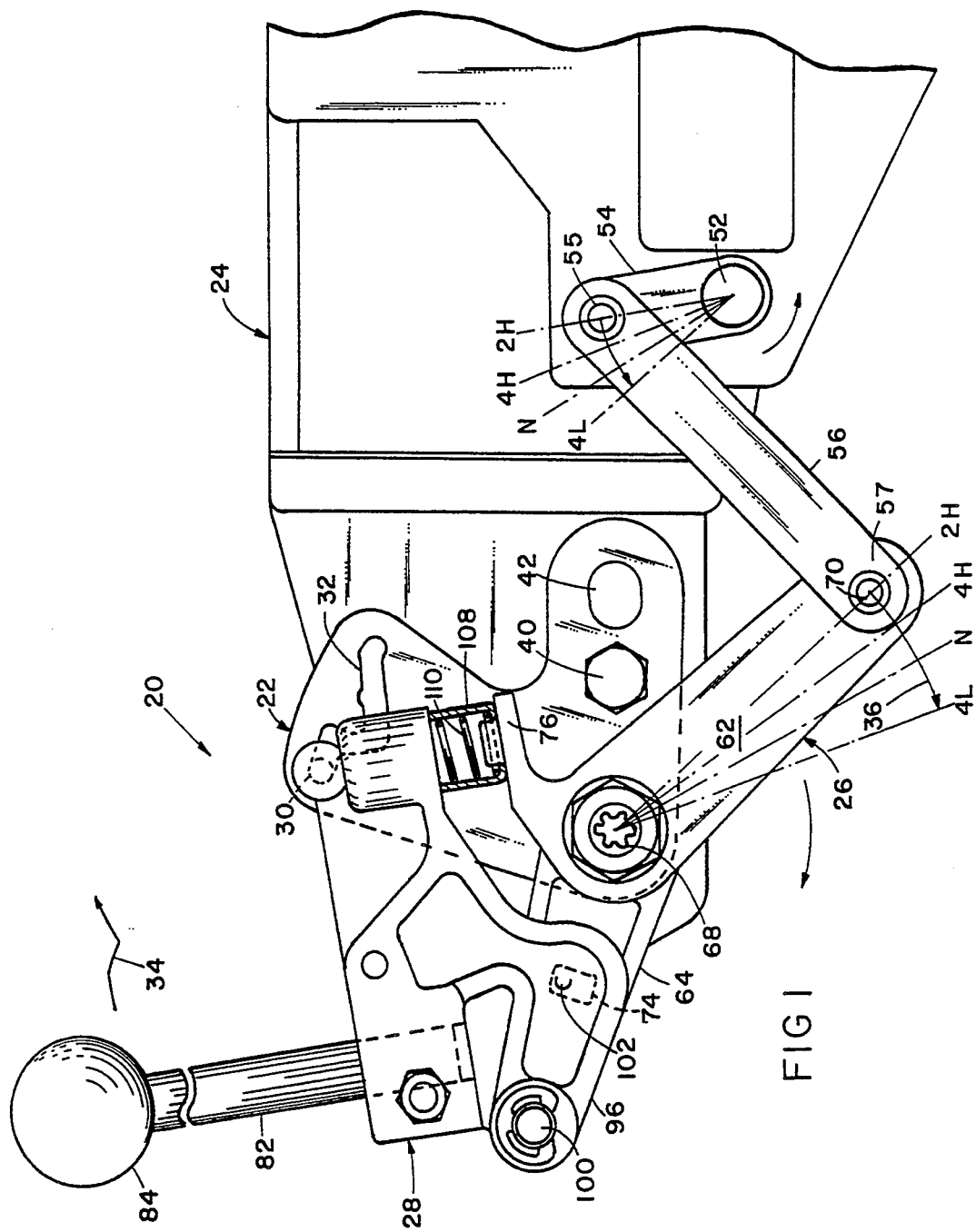
FIG. 1 is a side view of a shift lever assembly embodying the present invention, the shift lever assembly being shown attached to a transfer case.
Figure 3:
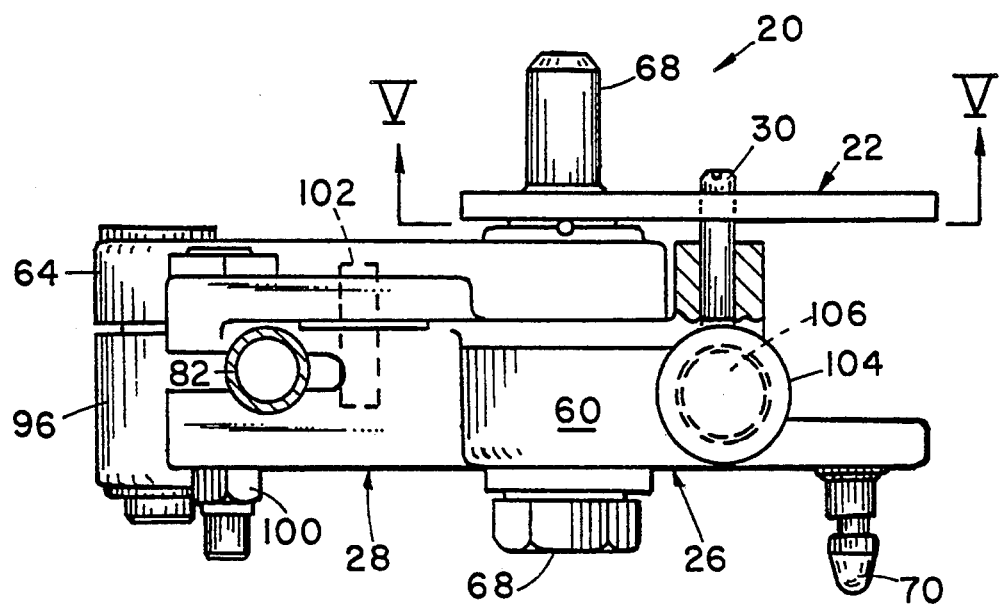
FIG. 3 is a top view of the shift lever assembly shown in FIG. 2.

A shift lever assembly 20 (FIG. 1) embodying the present invention includes a detent plate 22 adapted for mounting to a transfer case 24. Shift lever assembly 20 further includes an actuator 26 pivotally mounted to the detent plate 22 and operably connected to a shifting mechanism (not shown) in the transfer case. A lever subassembly 28 is pivotally mounted to actuator 26 and includes a lever 82 that extends upwardly into the vehicle passenger compartment. Lever subassembly 28 is further operably connected to the mounting or detent plate 22 in a manner that allows an operator to manually and ergonomically shift lever subassembly 28 and in turn actuator 26 and the shifting mechanism. In particular, a detent pin 30 on lever subassembly 28 engages a Z-Shaped slot 32 in detent plate 22 so as to control the pivotal movement of lever subassembly 28 on actuator 26 as actuator 26 is pivotally moved on detent plate 22. This allows lever subassembly 28 to move along a first optimal path 34 (FIG. 7) while actuator 26 moves along a corresponding but different second path 36. Due to the shape of Z-shaped slot 32, lever subassembly 28 moves rearwardly and downwardly with a continuous "pull-down" type motion generally toward the operator's forearm and elbow as actuator 26 actuates the shifting mechanism in transfer case 24.

The transfer case 24 (FIG. 1) to which shift lever assembly 20 attaches includes a shifting mechanism (not shown) which is actuated by rotating shaft 52 in transfer case 24. Link 54 is secured to shaft 52 and extends laterally. A second link 56 is pivotally connected to link 54 at connection 55, and includes a free end 57 that extends laterally. Links 54 and 56 form a mechanical linkage adapted to shift the shifting mechanism between various gear positions. In particular, the shifting mechanism is shiftable between a two-wheel-drive high-vehicle-speed (2H) gear position, a four-wheel-drive high-vehicle-speed (4H) gear position, a neutral (N) gear position, and a four-wheel-drive low-vehicle-speed (4L) gear position. Notably, shift lever assembly 20 includes 2H, 4H, N and 4L positions corresponding to shifting mechanism 2H, 4H, N and 4L gear positions, as described below.

Figure 6:
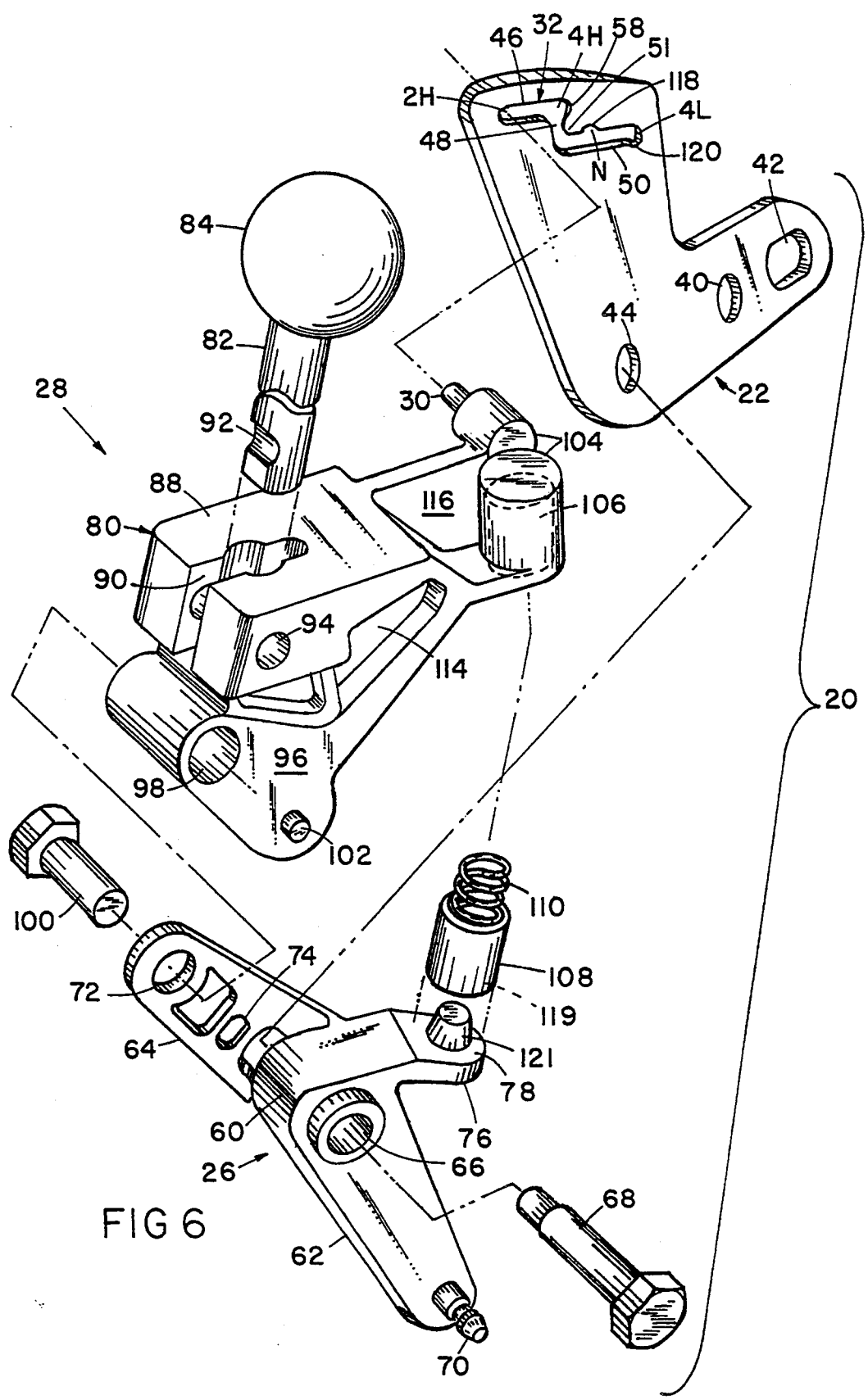
FIG. 6 is an exploded perspective view of the shift lever assembly shown in FIG. 2.

Detent plate 22 (FIGS. 5 and 6) of shift lever assembly 20 is an L-shaped plate that includes a pair of attachment holes 40 and 42 for securely attaching detent plate 22 to transfer case 24. Detent plate 22 further includes a pivot-receiving aperture 44. The Z-shaped slot 32 in detent plate 22 is spaced from aperture 44. Z-shaped slot 32 includes a first end portion 46, an angled middle portion 48, and a second end portion 50. It is contemplated that variously shaped slots can be used to give a desired "feel" to the operator and to give the lever subassembly 28 the desired motion. In the illustrated detent plate 22, first end portion 46 is arcuately-shaped and defines a continuous radius about pivot-receiving aperture 44. Middle portion 48 extends at an angle to first end portion 46, middle portion 48 extending generally toward pivot-receiving aperture 44. Second end portion 50 extends in a general direction parallel to first end portion 46, but second end portion 50 is generally linear and its extreme end terminates at a radius comparable to that of first end portion 46. A protruding inner corner 51 is defined by middle portion 48 and second end portion 50.

Actuator 26 (FIG. 6) includes an enlargement 60 from which two arms 62 and 64 extend in generally opposite directions. However, arms 62 and 64 are located at an angle to each other when viewed from a side (FIG. 2), and further extend from opposite ends of enlargement 60 when viewed from the rear (FIG. 4). Arms 62 (and 64) are reinforced as required, such as by web 65. A pivot-receiving bore 66 (FIG. 6) extends through enlargement 60, and a shoulder pivot pin 68 (FIG. 1) is extended through bore 66 and detent plate pivot-receiving aperture 44 to pivotally interconnect actuator 26 to detent plate 22. Actuator arm 62 includes a connector 70 that pivotally connects to the free end 57 of second link 56. By pivotally rotating actuator 26 about pivot pin 68, shaft 52 is rotated to thus shift the shifting mechanism in transfer case 24.

The second arm 64 (FIG. 6) of actuator 26 includes a second pivot-receiving aperture 72 which is spaced from bore 66. Located between aperture 72 and bore 66 about midway on arm 64 is a limit pin slot 74, with its length extending perpendicular to the length of arm 64. A finger-like protrusion 76 also extends from enlargement 60, protrusion 76 defining a surface 78 useful for engaging a plunger 108 and biasing spring 110 as noted below.

Lever subassembly 28 (FIG. 6) includes a cast base 80. A post-like lever 82 extends upwardly from base 80 and terminates in a handle 84. Base 80 is configured with an enlargement 88 having a slotted opening 90 configured to mateably receive the lower end of lever 82. The lower end of lever 82 includes a transversely oriented notch 92 and base 80 includes a transversely oriented hole 94 adapted to receive a bolt (not shown) to securely engage notch 92 to retain lever 82 in base 80.

Base 80 of lever subassembly 28 further includes a second enlargement 96 including a pivot-receiving bore 98. Bore 98 is adapted to receive a pivot pin 100 (FIG. 1). Pivot pin 100 is extended through pivot-receiving aperture 72 and bore 98 to pivotally mount lever subassembly 28 to actuator 26. A limit pin 102 extends laterally from second enlargement 96 into limit pin slot 74, thus limiting the movement of lever subassembly 28 relative to actuator 26 as limit pin 102 engages the ends of limit pin slot 74.

Figure 2:
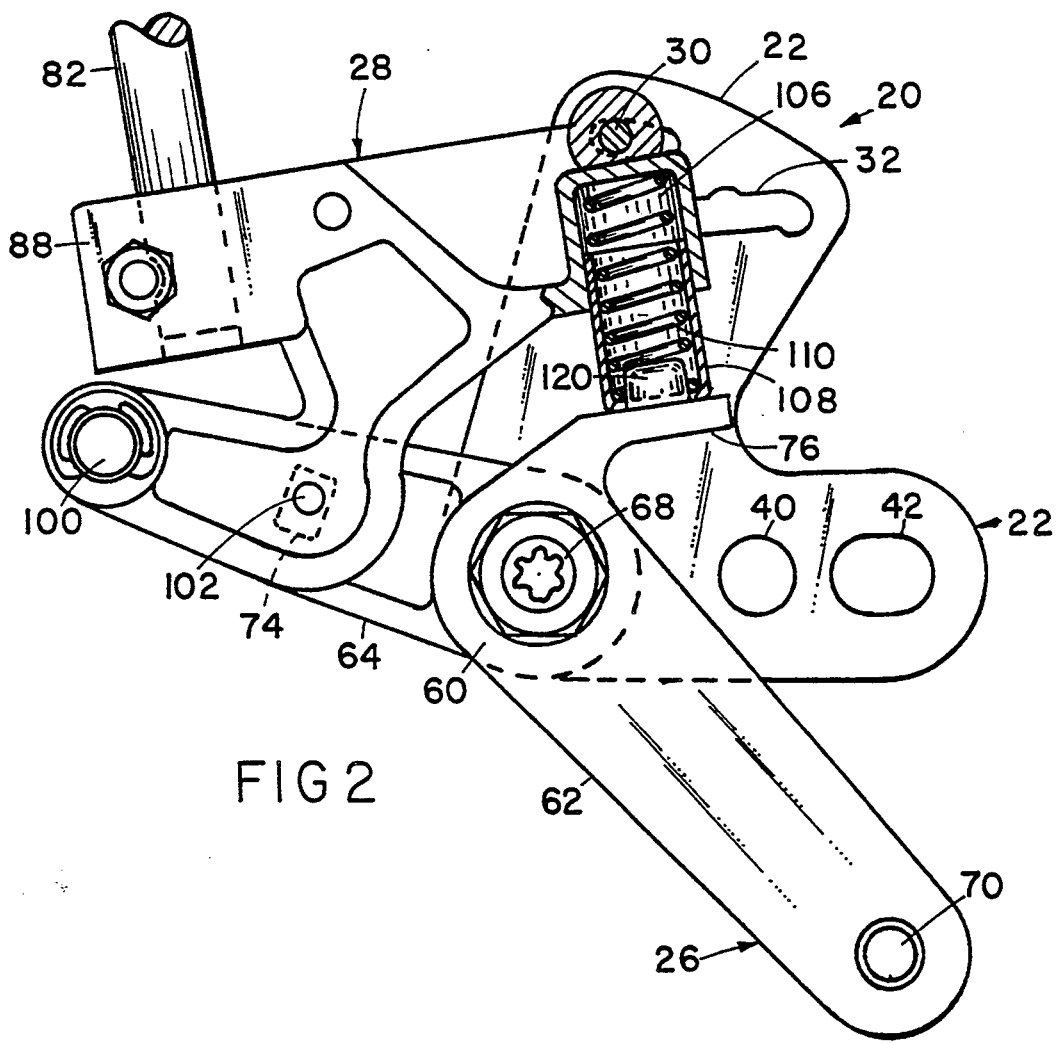
FIG. 2 is a partially broken away side view of the shift lever assembly shown in FIG. 1.

Base 80 includes a third enlargement 104 spaced from enlargements 88 and 96. Third enlargement 104 includes a downwardly oriented pocket or recess 106 for receiving a plunger 108 and biasing spring 110. Pocket 106 is oriented and positioned so that with lever subassembly 28 pivotally attached to actuator 26 by pivot pin 100, plunger 108 engages protrusion 76 on actuator 26. Biasing spring 110 is compressed within pocket 106 and biases plunger 108 against protrusion 76. The resulting forces bias lever subassembly 28 counterclockwise about pivot pin 100 relative to actuator 26 as shown in FIG. 2. Notably, enlargements 88, 96 and 104 are interconnected by structural webs such as webs 114 and 116 (FIG. 6) as necessary to provide the necessary structural stiffness to base 80.

Detent pin 30 (FIG. 6) extends sideways from third enlargement 104 into Z-shaped slot 32 (FIGS. 4 and 5). Detent pin 30 operably slideably engages slot 32 to control the movement of lever subassembly 28 relative to actuator 26 and detent plate 22 as lever subassembly 28 is moved to shift actuator 26.

The shape of Z-shaped slot 32 defines a plurality of positions corresponding to the gear shift positions of the shifting mechanism. In particular, the extreme end of Z-shaped slot end portion 46 defines a 2H position corresponding to the 2H gear position of the shifting mechanism. Also, the juncture of slot first end 46 and middle portion 48 defines a 4H position corresponding to the 4H gear position of the shifting mechanism. Notably, protrusion 51 further defines the 4H position by defining a depression 58 at the end of the slot first end 46 at the 4H position. This depression 58 gives the operator an increased feel for the 4H position, and also helps to prevent accidentally shifting straight through the 4H position toward the N and 4L positions.

The N position is located on second end portion 50 proximate the juncture of middle portion 48 and second end portion 50. A notch-like depression 118 on the upper side of slot second end portion 50 further defines the N position. The N position in Z-shaped slot 32 corresponds to the N gear position in the shifting mechanism. A 4L position is located at the extreme end of second end portion 50 in a depression 120 that hooks downwardly slightly from the length of second end portion 50. The 4L position corresponds to the 4L gear position in the shifting mechanism. Notably, the transfer case shifting mechanism includes its own detent biasing mechanism to keep the shifting mechanism in a given selected gear shift position and also to help give the operator a proper feel for each of the gear shift positions. However, the Z-shaped slot arrangement noted above further assists in giving the operator a feel for the gear positions, and also helps prevent an operator from an accidental "crash-through" to the 4L position when shifting from the 2H position to the 4H, N and L positions.

Figure 7:
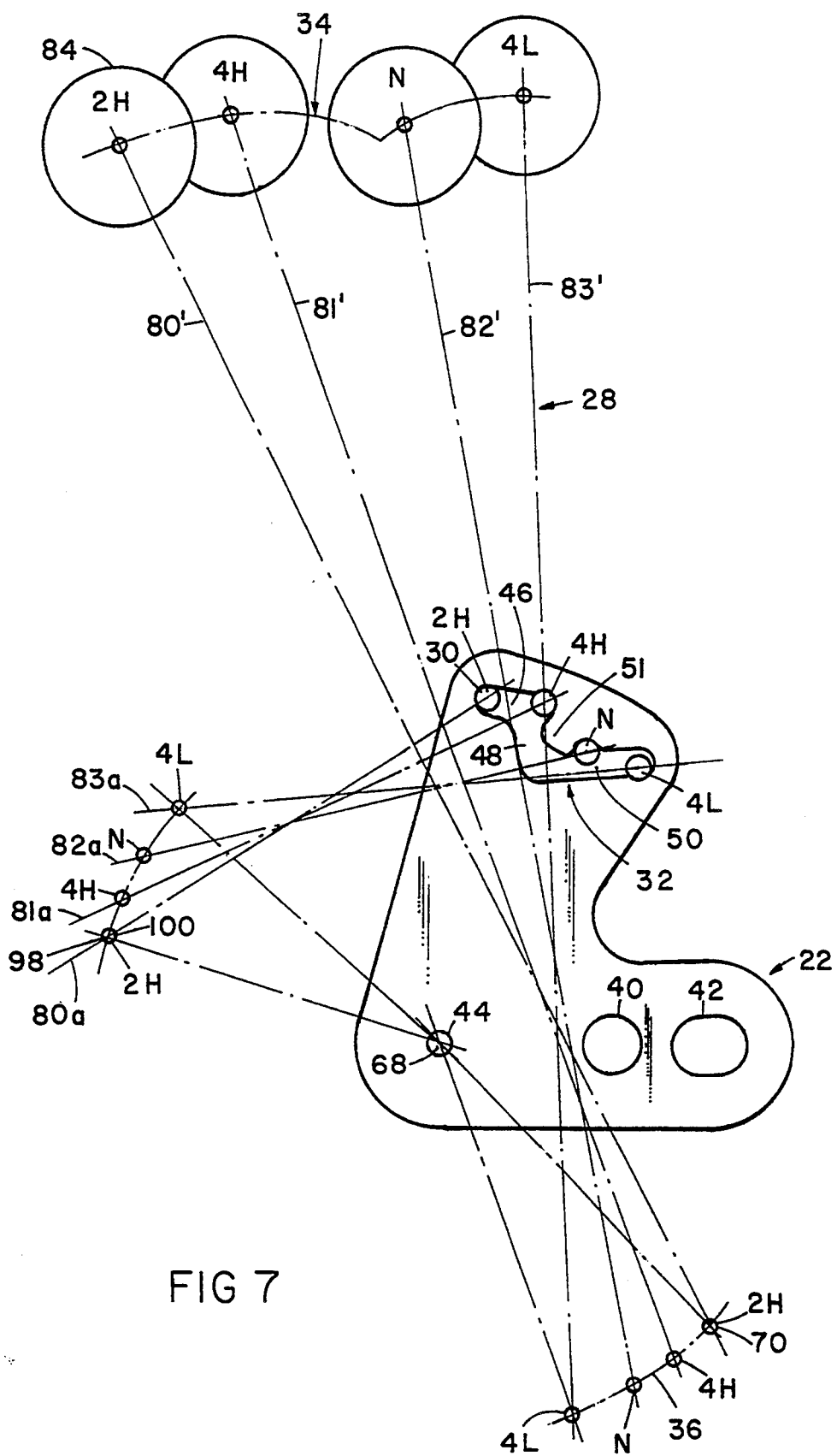
FIG. 7 is a schematic view showing the path of the shift handle and the connector as the shift lever assembly is moved between various positions.

With shift lever assembly 20 assembled as noted above, lever subassembly 28 can be moved so that actuator connector 70 positions the shifting mechanism in the 2H gear position and so that detent pin 30 is located in the 2H position in Z-shaped slot 32 (FIG. 7). When an operator desires to shift from the 2H position to the 4H position, the operator grasps handle 84 and pulls rearwardly and downwardly with a continuous "pull-down" motion along path 34 generally defined as being rearwardly toward the operator's forearm and elbow but also slightly downwardly in some segments. Testing has shown this "pull-down" motion to be relatively easily and ergonomically accomplished, as opposed to prior known comparable shifters which must be consciously pushed down during part of their shifting movement.

The rearward shifting of actuator 26 causes actuator 26 to pivot on pivot pin 68 and thus move connector 70, which in turn cranks transfer case shaft 52 to the desired 4H gear position. Due to the biasing force of biasing spring 110 and plunger 108 acting on protrusion 76 of actuator 26 (FIG. 1), actuator 26 and lever subassembly 28 pivot as a unit about pivot pin 68.

As handle 84 is further moved with the "pull-down" motion from the 4H to the N position (FIG. 7), detent pin 30 is forced through middle portion 48. This causes lever subassembly 28 to pivot clockwise on second pivot pin 100, which motion is resisted by biasing spring 110. As lever subassembly 28 rotates on pivot pin 100, actuator 26 (and in particular actuator connector 70) experiences lost motion and even experiences a slight rearward counterclockwise "kicking" movement about pivot pin 68. This occurs as lever subassembly 28 is moved clockwise from the 4H position to the N position and detent pin 30 is forced over protrusion 51 and along middle portion 48 of Z-shaped slot 32. Once detent pin 30 passes over and around protrusion 51, actuator 26 is again pivoted clockwise and connector 70 forces links 54 and 56 to crank shaft 52 to the N gear position. Due to the angle of second end portion 50, connector 70 moves quickly to the N position once detent plate 30 passes over and around protrusion 51. Notably, limit pin 102 engages an end of limit pin slot 74 as detent pin 30 passes over protrusion 51 (FIG. 2) so that limit pin 102 engages actuator 26 and forces actuator 26 to begin to move. Once past protrusion 51, limit pin 102 moves toward a centered position in limit pin slot 102. Detent depression 118 (FIG. 7) frictionally retains detent pin 30 in the N position. Once in the N position, lever subassembly 28 can then be moved to the 4L position. Due to the angle of second end portion 50 of Z-shaped slot 32, actuator 26 pivots on pivot pin 68 and lever subassembly also pivots on pivot pin 100 as lever subassembly 28 is moved from the N position to the 4L position.

The action of detent pin 30 in slot 32 causes handle 84 to move through segmented path 34 (FIG. 7) that is continuously "pull-down" and also which is ergonomic for the operator, but which gives the operator a feel for the shift positions. Further, the detent pin 30 and slot 32 combination prevents "crash-through" when shifting from the 4H to the 4L positions by providing a kickback to the actuator 26 as detent pin 32 moves out of depression 58 and around corner 51. Testing is shown that this "feel" is most acceptable if detent pin 30 and Z-shaped slot 32 are located between the operator and the pivot point defined by pivot pin 68. Also, the "feel" has tested to be optimal when lines 80', 81', 82' and 83' between handle 84 and connector 70 are generally continuously, substantially perpendicular to lines 80a, 81a, 82a and 83a between detent pin 30 to the pivot defined by pivot pin 100 as the shift lever assembly is shifted from 2H, 4H, N and 4L, respectively. Still further, the optimum motion of handle 84 has been found to be a continuous "pull-down" motion defined by a first segment that is generally rearwardly, a second segment that is more rearwardly and downwardly, and a third segment that is generally rearwardly.

It is also noted that each of the components including detent plate 22, actuator 26, and shift lever subassembly 28 are constructed with upper surfaces that tend to shed moisture and which do not include upwardly oriented pockets or depressions for catching and retaining moisture. Consistent with this, an aperture 119 (FIG. 6) is located at the tip of plunger 108. Also, a tooth 121 can be added to protrusion 76 to securely locate plunger 108 on protrusion 76.

MODIFICATION

In some instances, it has been found preferable not to provide a "kickback" type motion to actuator 26 as lever subassembly 28 is moved from the 4H position to the N position. However, it is desirable to maintain the detented "feel" to the operator and also prevent "crash-through". FIGS. 8–14 disclose a modified shift lever assembly 20A provided for this purpose. In the below description, comparable features are designated with the same number but with the letter A added to the number to better distinguish the second modification.

Modified shift lever assembly 20A includes a modified slot 32A and an elongated secondary detent plate 130A. Secondary detent plate 130A is added to more positively prevent "crash-through" or accidental shifting from the 4H position through the N position to the 4L position in assembly 20A. Slot 32A is modified with a middle portion 48A that generally slopes at about a 45° angle to first end portion 46A. Secondary detent plate 130A includes a hole 131A, and pivot pin 68A extends through hole 131A to pivotally mount secondary detent plate 130A to assembly 20A, although it is contemplated that secondary detent plate 130A can be mounted substantially any place on detent plate 22A or actuator 26A, and optimally is mounted in-line with pivot pin 68A and slot 32A.

As best disclosed in FIG. 10, detent plate 130A includes an inverted L-shaped slot or notch 132A, notch 132A including an elongated vertical portion 134A and a lateral depression 136A at one end of vertical portion 134A, with a corner 144A defined at their juncture.

Figure 11:
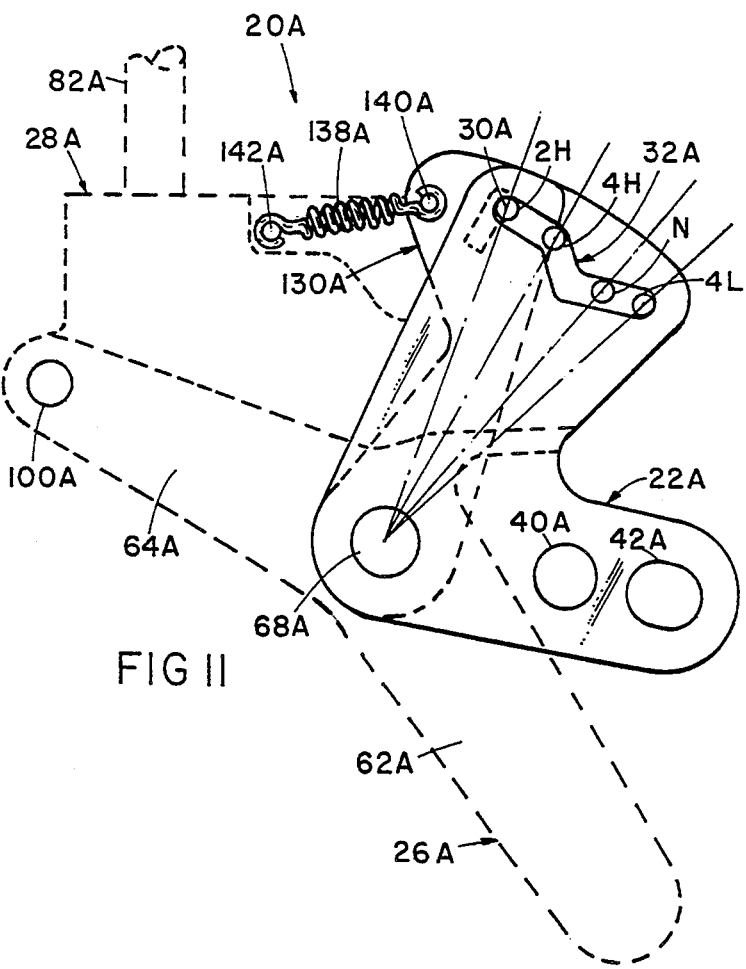
FIG. 11 a side view showing the modified shift lever assembly with the lever and actuator being shown in phantom.
Figures 12, 13:
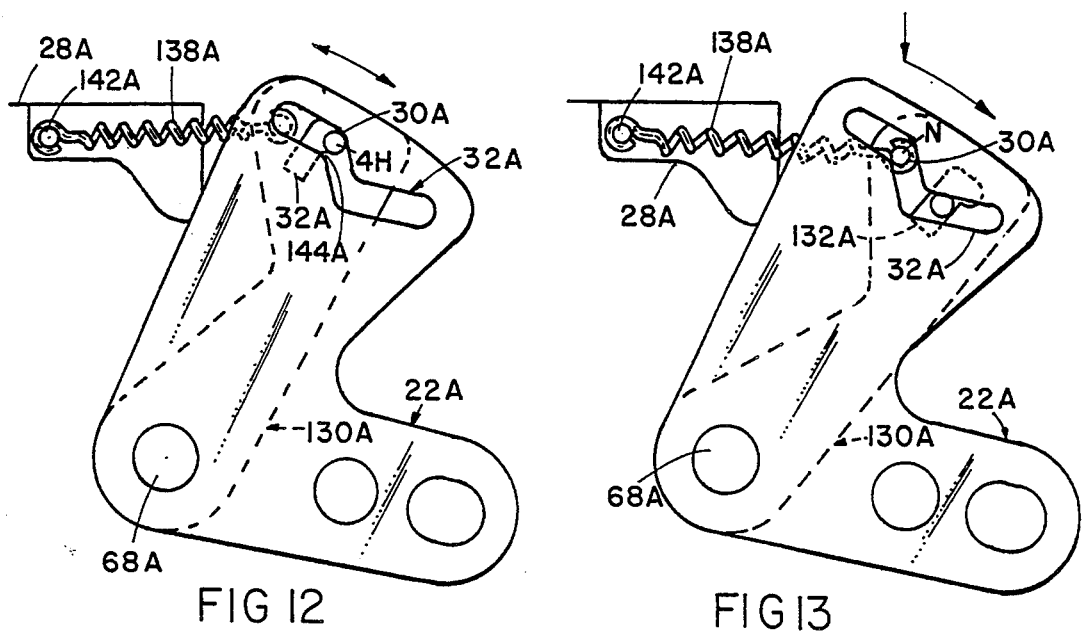

Secondary detent plate 130A is biased counterclockwise as shown in FIGS. 9 and 11 by a biasing spring 138A. Spring 138A is attached to secondary detent plate 130A at a connection 140A at one end and being attached to a pin 142A on lever base 80A at the other end. L slot depression 136A is oriented so that detent pin 30A engages depression 136A when detent plate 130A is in the 2H position or in the 4H position (FIGS. 11 and 12).

As an operator initially moves lever subassembly 28A from the 4H position toward the N position (FIG. 13), detent pin 30A shifts out of depression 136A and over corner 144A defined by depression 136A. As the operator further moves lever subassembly 28A to then position, detent pin 30A moves into the elongated portion 134A of L-shaped slot 132A. Both of these actions stretch spring 138A and give a "feel" to the operator that is comparable to the first embodiment as previously discussed. Lever subassembly 28A can then be further shifted from N position to the 4L position (FIG. 14).

Thus, there is provided shift lever assemblies adapted so that an operator can shift from a 2H position to 4H, N and 4L positions with a continuous "pull-down" type motion which is ergonomical and readily accomplished but which prevents crash-through or accidental shifting when shifting, particularly from the 4H position to the 4L position.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A shift lever assembly for a transfer case of a vehicle, including a shifting arm on said transfer case rotatable for shifting between a plurality of gear shift positions, said shift lever assembly comprising:
   a detent plate including a slot means defining a plurality of positions corresponding to said gear shift positions, respectively, said detent plate including a first pivot-receiving means spaced from said slot means and also including means for mounting said detent plate to the transfer case;
   an actuator including first and second arms, said first arm including a connector adapted to be operably connected to the shifting arm of said transfer case and said second arm including a second pivot-receiving means;
   first pivot means operably engaging said first pivot-receiving means for pivotally mounting said actuator to a transfer case;
   a lever subassembly including a base and a shift lever extending from said base, said shift lever including a handle, said base including a detent pin adapted for movement in said slot means;
   second pivot means operably engaging said second pivot-receiving means for pivotally mounting said lever subassembly to said actuator so that said detent pin is positioned in said slot means, said detent pin being movable between the positions by movement of said lever subassembly about said second pivot means and by movement of said actuator about said first pivot means;
   biasing means operatively connected to said lever subassembly and said actuator for biasing said lever subassembly in a rotative direction about said second pivot means relative to said actuator so that said detent pin operably engages said slot means; and
   said second pivot means being located relative to said first pivot means whereby pivoting of said lever subassembly relative to said actuator pivots said lever subassembly against the bias of said biasing means to move said detent pin from at least one gear shift position in said slot means to another gear shift position in said slot means.

2. A shift lever as defined in claim 1 wherein said slot means defines a 2H position, a 4H position, a N position and a 4L position.

3. A shift lever assembly as defined in claim 2 wherein said slot means is constructed so that said lever subassembly can be moved from the 2H position through each of the 4H, N and 4L positions with an ergonomic and substantially continuous "pull-down" motion by the operator.

4. A shift lever assembly as defined in claim 3 wherein lines extending between said handle and said connector and lines extending between said second pivot means and said detent pin are substantially continuously perpendicular as said lever subassembly is moved between the 2H, 4H, N and 4L positions.

5. A shift lever assembly as defined in claim 3 wherein said slot means is Z-shaped and includes a middle portion configured so that said connector experiences lost motion as said lever subassembly is moved from the 4H position to the N position.

6. A shift lever assembly as defined in claim 5 wherein said detent pin engages said slot to abruptly change the angle of movement of said lever subassembly as said lever subassembly is moved from the 2H position to the 4H position and then to the N position, thus substantially eliminating the possibility of accidentally shifting from the 4H through the N position to the 4L position.

7. A shift lever assembly as defined in claim 1 wherein said slot means is "Z" shaped.

8. A shift lever assembly as defined in claim 7 including a second detent plate movably mounted to said second pivot means, said second detent plate including a second slot means for engaging said detent pin, said second biasing means biasing said second detent plate so that said second slot means engages said detent pin to provide additional resistance to movement as said lever subassembly is pivoted between said 4H and N positions.

9. A shift lever assembly as defined in claim 1 wherein the axis of rotation defined by said first pivot means is located below said detent pin but generally between said detent pin and the axis of rotation defined by said second pivot means.

10. A shift lever assembly as defined in claim 1 wherein said lever subassembly, said actuator, and said detent plate are constructed with upper surfaces adapted to shed moisture which collects thereon.

11. A shift lever assembly as defined in claim 2 wherein said slot means includes various portions shaped to permit said lever subassembly to be moved from the 2H position through each of the 4H, N and 4L positions with a continuous motion by an operator, the continuous motion being interrupted into segments by said slot means as said detent pin engages the various portions of said slot means.

12. A shift lever assembly as defined in claim 2 wherein one of said actuator and said lever subassembly includes a limit pin and the other of said actuator and said lever subassembly includes a limit pin slot adapted to receive said limit pin, said limit pin moving within said limit pin slot for limiting the movement of said shift lever subassembly relative to said actuator.

13. A shift lever assembly or defined in claim 12 wherein said limit pin engages an end of said limit pin slot as said detent pin is moved from the 4H position to the N position, whereby said lever subassembly cannot be fully moved into the N position unless said actuator also is rotated, thus assuring that said connector has also shifted said shifting mean s to the N gear position.

14. A shift lever assembly as defined in claim 2 wherein said connector moves through an arcuate path about said first pivot means as said connector is moved between the 2H, 4H, N, and 4L positions, and said lever subassembly moves through a second path corresponding to said first path, said second path being defined in part by movement about said first pivot means and in part by movement about said second pivot means, said movement about said second pivot means being controlled by the shape of said slot means and the engagement of said detent pin in said slot means.

15. A shift lever assembly as defined in claim 2 wherein said slot means includes a middle portion located between the 4H and N positions, said middle portion being configured so that said connector experiences lost motion as said lever subassembly is moved from the 4H position to the N position.

16. A shift lever assembly as defined in claim 15 wherein said slot means includes end portions and said middle portion of said slot means is angled relative to the end portions of said slot means, said detent pin engaging said middle and end portions and causing said lever subassembly to move in a discontinuous path as said lever subassembly is moved from the 2H position to the 4H, N and 4L positions, thus reducing the chances of an operator accidentally shifting from the 4H position through the N position to the 4L position.

17. A shift lever assembly as defined in claim 1 wherein said slot means includes end portions and a middle portion, with the middle portion being oriented at an angle with respect to said end portions.

18. A shift lever assembly for a transfer case of a vehicle, the transfer case including a shifting arm for shifting between a plurality of gear shift positions, said shift lever assembly comprising:
   a detent plate including a slot means defining a plurality of positions corresponding to said gear shift positions, respectively, said detent plate including a first pivot-receiving means spaced from said slot means and also including means for mounting said detent plate to the transfer case;
   an actuator including first and second arms, said first arm including a connector adapted to be operably connected to the shifting arm of said transfer case and said second arm including a second pivot-receiving means;
   first pivot means operably engaging said first pivot-receiving means for pivotally mounting said actuator to a transfer case;
   a lever subassembly including a base and a shift lever extending from said base, said shift lever including a handle, said base including a detent pin adapted for movement in said slot means;
   second pivot means operably engaging said second pivot-receiving means for pivotally mounting said lever subassembly to said actuator so that said detent pin is positioned in said slot means, said detent pin being movable between the positions by movement of said lever subassembly about said second pivot means and by movement of said actuator about said first pivot means;
   biasing means operatively connected to said lever subassembly and said actuator for biasing said lever subassembly in a rotative direction about said second pivot means relative to said actuator so that said detent pin operably engages said slot means; and
   said actuator including sides, said lever subassembly being operably connected to one of said sides and said detent plate being connected to the other of said sides.

19. A shift lever assembly for a transfer case of a vehicle, the transfer case including a shifting arm for shifting between a plurality of gear shift positions, said shift lever assembly comprising:
   a detent plate including a slot means defining a plurality of positions corresponding to said gear shift positions, respectively, said detent plate including a first pivot-receiving means spaced from said slot means and also including means for mounting said detent plate to the transfer case;
   an actuator including first and second arms, said first arm including a connector adapted to be operably connected to the shifting arm of said transfer case and said second arm including a second pivot-receiving means;
   first pivot means operably engaging said first pivot-receiving means for pivotally mounting said actuator to a transfer case;
   a lever subassembly including a base and a shift lever extending from said base, said shift lever including a handle, said base including a detent pin adapted for movement in said slot means;
   second pivot means operably engaging said second pivot-receiving means for pivotally mounting said lever subassembly to said actuator so that said detent pin is positioned in said slot means, said detent pin being movable between the positions by movement of said lever subassembly about said second pivot means and by movement of said actuator about said first pivot means;
   biasing means operatively connected to said lever subassembly and said actuator for biasing said lever subassembly in a rotative direction about said second pivot means relative to said actuator so that said detent pin operably engages said slot means; and
   a second detent plate operably movably mounted to said second pivot means, said second detent plate including a second slot means for engaging said detent pin.

20. A shift lever assembly for a transfer case of a vehicle, the transfer case including a shifting arm for shifting between a plurality of gear positions, said shifter lever assembly comprising:
   a detent plate including mounting means for mounting to the transfer case;
   an actuator including connector means for operably connecting to the shifting arm of the transfer case;
   a lever including a handle adapted to be grasp by an operator; and
   first interconnecting means for interconnecting said lever to said actuator, second interconnecting means for operatively interconnecting said actuator to said detent plate, and third interconnecting means for operably connecting said lever to said detent plate, said third interconnecting means including means for controlling the movement of the lever, said means for controlling including a Z-shaped slot, said first, second and third interconnecting means cooperating so that said handle moves through a first path during which said connector means is driven through a second path as required to shift between said plurality of gear positions, thus permitting art operator to shift between the gear positions with a continuous ergonomic "pull-down" shift motion of the handle, whereby an ergonomic shift motion of the handle is provided but with controlled movement as required to prevent accidental shifting between the plurality of gear positions.

21. A shift lever assembly as defined in claim 20 wherein said second interconnecting means includes pivotally mounting said lever to said actuator.

22. A shift lever assembly as defined in claim 20 wherein said means for controlling includes a detent pin operably mounted to one of the said detent plate, and said lever, and said Z-shaped slot includes detents located in the other of said detent plate and said lever which cooperates with said detent pin to interrupt the continuous movement of the lever as the lever is moved along the first path.

23. A shift lever assembly as defined in claim 20 wherein said first and second interconnecting means provides lost motion to said connector means as said lever moves along said first path.

24. A shift lever assembly for a transfer case of a vehicle, the transfer case including a shifting arm for shifting between a plurality of positions, said shifter lever assembly comprising:
a detent plate including mounting means for mounting to the transfer case;
an actuator including connector means for operably connecting to the shifting arm of the transfer case;
a lever including a handle adapted to be grasp by an operator; and
first interconnecting means for interconnecting said lever to said actuator, second interconnecting means for operatively interconnecting said actuator to said detent plate, and third interconnecting means for operably connecting said lever to said detent plate, said third interconnecting means including means for controlling the movement of the lever, said first, second and third interconnecting means cooperating so that said handle moves through a first path during which said connector means is driven through a second path as required to shift between said plurality of gear positions, thus permitting an operator to shift between the gear positions with a continuous ergonomic "pull-down" shift motion of the handle, whereby an ergonomic shift motion of the handle is provided but with controlled movement as required to prevent accidental shifting between the plurality of gear positions, said second interconnecting means pivotally mounting said lever to said actuator, said first interconnecting means pivotally mounting said actuator to said detent plate; and
said first interconnecting means includes pivotally mounting said actuator to said detent plate.

25. A shift lever assembly for a transfer case having a shifting arm movable between a plurality of gear positions, said shift lever assembly comprising:
a detent plate including a detented surface defining a plurality of positions corresponding to said gear positions, respectively, said detent plate including a first aperture with the detented surface being spaced from said first aperture;
an actuator including a second aperture and further including first and second arms, said first arm including a connector adapted to operably connect to the shifting arm on said transfer case and said second arm including a second aperture;
a first pivot pin engaging said first and second apertures to pivotally mount said actuator to said detent plate;
a lever subassembly including a base and a shift lever extending from said base, said shift lever including a handle, said base including a third aperture and a detent pin spaced from said third aperture, said detent pin being adapted for movement on said detented surface;
said actuator including a fourth aperture spaced from said second aperture and said connector;
a second pivot pin engaging said third aperture and said fourth aperture to pivotally mount said lever subassembly to said actuator so that said detent pin engages said detented surface, said detent pin being movable between the positions on said detented surface by movement of said lever subassembly about said second pivot pin and by movement of said actuator about said first pivot pin; and
means connected to said lever subassembly for biasing said lever subassembly relative to said actuator so that said detent pin operably engages said detented surface.

26. A shift lever assembly for a transfer case of a vehicle, the transfer case including a shifting arm for shifting between a plurality of gear positions, said shift lever assembly comprising:
a lever subassembly;
an actuator including a first arm adapted to operably connect to said lever subassembly and a second arm including a connector adapted to operably attach to the shifting arm of said transfer case;
first mounting means for movably mounting said actuator to the transfer case;
second mounting means for movably mounting said lever subassembly to one of said actuator and said transfer case so that by moving said lever subassembly along a first path, said connector moves along a corresponding path corresponding to said first path to thus shift between the plurality of gear positions;
one of said lever subassembly and said first mounting means including a Z-shaped slot corresponding to said plurality of gear positions; and
the other of said lever subassembly and said first mounting means including a detent pin for operably engaging said Z-shaped slot, said detent pin cooperatingly engaging said Z-shaped slot as said actuator is pivotally moved on said first mounting means and said lever subassembly is pivotally moved on said second mounting means, said first path being oriented with respect to an operator operating the shift lever assembly to thus permit a continuous "pull-down" motion by the operator.

27. A shift lever assembly as defined in claim 26 wherein said lever subassembly includes said Z-shaped slot and said first mounting means includes said detent pin.

28. A shift lever assembly for a transfer case of a vehicle, including a shifting arm on said transfer case rotatable for shifting between a plurality of positions, said shift lever assembly comprising:
- a detent plate including a Z-shaped slot defining a plurality of positions corresponding to said gear shift positions, respectively, said detent plate including a first pivot-receiving means spaced from said slot and also including means for mounting said detent plate to the transfer case;
- an actuator including first and second arms, said first arm including a connector adapted to be operably connected to the shifting arm of said transfer case and said second arm including a second pivot-receiving means;
- first pivot means operably engaging said first pivot-receiving means for pivotally mounting said actuator to a transfer case;
- a lever subassembly including a base and a shift lever extending from said base, said shift lever including a handle, said base including a detent pin adapted for movement in said slot;
- second pivot means operably engaging said second pivot-receiving means for pivotally mounting said lever subassembly to said actuator so that said detent pin is positioned in said slot, said detent pin being movable between the positions by movement of said lever subassembly about said second pivot means and by movement of said actuator about said first pivot means; and
- biasing means operatively connected to said lever subassembly and actuator for biasing said lever subassembly in a rotative direction about said second pivot means relative to said actuator so that said detent pin operably engages said slot.

29. A shift lever assembly for a transfer case of a vehicle, including a shifting arm on said transfer case rotatable for shifting between a plurality of gear shift positions, said shift lever assembly comprising:
- a detent plate including a slot means defining a plurality of positions corresponding to said gear shift positions, respectively, said detent plate including a first pivot-receiving means spaced from said slot means and also including means for mounting said detent plate to the transfer case;
- an actuator including first and second arms, said first arm including a connector adapted to be operably connected to the shifting arm of said transfer case and said second arm including a second pivot-receiving means;
- first pivot means operably engaging said first pivot-receiving means for pivotally mounting said actuator to a transfer case;
- a lever subassembly including a base and a shift lever extending from said base, said shift lever including a handle, said base including a detent pin adapted for movement in said slot means;
- second pivot means operably engaging said second pivot-receiving means for pivotally mounting said lever subassembly to said actuator so that said detent pin is positioned in said slot means, said detent pin being movable between the positions by movement of said lever subassembly about said second pivot means and by movement of said actuator about said first pivot means;
- biasing means operatively connected to said lever subassembly and said actuator for biasing said lever subassembly in a rotative direction about said second pivot means relative to said actuator so that said detent pin operably engages said slot means;
- said slot means defining a 2H position, a 4H position, a N position and a 4L position and being constructed so that said lever subassembly can be moved from the 2H position through each of the 4H, N and 4L positions with an ergonomic and substantially continuous "pull-down" motion by the operator, said slot means being Z-shaped and including a middle portion configured so that said connector experiences lost motion as said lever subassembly is moved from the 4H position to the N position;
- said detent pin engaging said slot to abruptly change the angle of movement of said lever subassembly as said lever subassembly is moved from the 2H position to the 4H position and then to the N position, thus substantially eliminating the possibility of accidentally shifting from the 4H through the N position to the 4L position; and
- a second biasing means connected to said lever subassembly for providing an elevated biasing force which must be overcome to move said detent pin from the 4H position to the N position.

30. A shift lever assembly for a transfer case of a vehicle, the transfer case including a shifting arm for shifting between a plurality of gear shift positions, said shift lever assembly comprising:
- a detent plate including a slot means defining a plurality of positions corresponding to said gear shift positions including a 2H position, a 4H position, a N position and a 4L position, said detent plate including a first pivot-receiving means spaced from said slot means and also including means for mounting said detent plate to the transfer case;
- an actuator including first and second arms, said first arm including a connector adapted to be operably connected to the shifting arm of said transfer case and said second arm including a second pivot-receiving means;
- first pivot means operably engaging said first pivot-receiving means for pivotally mounting said actuator to a transfer case;
- a lever subassembly including a base and a shift lever extending from said base, said shift lever including a handle., said base including a detent pin adapted for movement in said slot means;
- second pivot means operably engaging said second pivot-receiving means for pivotally mounting said lever subassembly to said actuator so that said detent pin is positioned in said slot means, said detent pin being movable between the positions by movement of said lever subassembly about said second pivot means and by movement of said actuator about said first pivot means;
- biasing means operatively connected to said lever subassembly and said actuator for biasing said lever subassembly in a rotative direction about said second pivot means relative to said actuator so that said detent pin operably engages said slot means; and
- a second biasing means connected to said lever subassembly for providing an elevated biasing force which must be overcome to move said detent pin from the 4H position to the N position.

* * * * *

UNITED STATES PATENT AND TRADEMARK OFFICE
CERTIFICATE OF CORRECTION

PATENT NO.  : 5,398,565
DATED       : March 21, 1995
INVENTOR(S) : Robert D. Brock It is certified that error appears in the above-indentified patent and that said Letters Patent is hereby corrected as shown below:

Column 1, line 56;

"grasp" should be --grasped--.

Column 7, line 14;

"to then" should be --to the N--.

Column 9, line 6, claim 13;

"or" should be --as--.

Column 9, line 12, claim 13;

"mean s" should be --means--.

Column 9, line 64, claim 18;

Before "adapted" delete --:--.

Column 10, line 64, claim 20;

"grasp" should be --grasped--.

Column 11, line 11, claim 20;

"art" should be --an--.

UNITED STATES PATENT AND TRADEMARK OFFICE
CERTIFICATE OF CORRECTION

PATENT NO. : 5,398,565
DATED : March 21, 1995
INVENTOR(S) : Robert D. Brock

It is certified that error appears in the above-indentified patent and that said Letters Patent is hereby corrected as shown below:

Column 11, line 42, claim 24;

"grasp" should be --grasped--.

Column 14, line 48, claim 30;

After "handle" delete --.--.

Signed and Sealed this

Tenth Day of October, 1995

Attest:

BRUCE LEHMAN

Attesting Officer

Commissioner of Patents and Trademarks